(12) United States Patent
Cui et al.

(10) Patent No.: US 12,742,916 B2
(45) Date of Patent: Sep. 22, 2026

(54) HIGH CONTRAST GRATING POLARIZER WITH ADJUSTABLE POLARIZATION CHARACTERISTICS

(71) Applicant: Zhejiang Berxel Photonics Co., Ltd., Jiaxing (CN)

(72) Inventors: Yao Cui, Jiaxing (CN); Constance Jui-Hua Chang-Hasnain, Jiaxing (CN); Jonas Horst Kapraun, Jiaxing (CN); Yipeng Ji, Jiaxing (CN)

(73) Assignee: Zhejiang Berxel Photonics Co., Ltd., Jiaxing (CN)

( * ) Notice: Subject to any disclaimer, the term of this patent is extended or adjusted under 35 U.S.C. 154(b) by 266 days.

(21) Appl. No.: 18/508,772

(22) Filed: Nov. 14, 2023

(65) Prior Publication Data

US 2024/0418918 A1 Dec. 19, 2024

(30) Foreign Application Priority Data

Jun. 16, 2023 (CN) ......................... 202310727896.2
Jun. 16, 2023 (CN) ......................... 202321552868.3

(51) Int. Cl.
*G02B 5/30* (2006.01)

(52) U.S. Cl.
CPC ......... *G02B 5/3016* (2013.01); *G02B 5/3041* (2013.01)

(58) Field of Classification Search
CPC .... G02B 5/3016; G02B 5/3041; G02B 5/008; G02B 5/3058; G02F 2201/30;
(Continued)

(56) References Cited

U.S. PATENT DOCUMENTS 10,353,238 B2 * 7/2019 Zha ........................ G02B 30/25
2007/0242187 A1 * 10/2007 Yamaki ................ G02B 5/3058
359/487.03

(Continued)

FOREIGN PATENT DOCUMENTS

JP 2006126338 A 5/2006
JP 2011509418 A 3/2011

(Continued)

OTHER PUBLICATIONS

Japanese First Office Action and english translation for Japanese Application No. 2023198963 dated Aug. 19, 2024.

(Continued)

*Primary Examiner* — Matthew Y Lee
(74) *Attorney, Agent, or Firm* — Young Basile Hanlon & MacFarlane, P.C.

(57) ABSTRACT

Provided is a high contrast grating polarizer with adjustable polarization characteristics, relating to the technical field of photoelectric devices. The high contrast grating polarizer includes a transparent substrate; and a plasma metal antenna structure layer, a refractive index electrically-tunable switching layer, a first electrode layer, and a second electrode layer located on the transparent substrate, where the plasma metal antenna structure layer includes a high contrast grating and a plasma metal antenna structure interleaved with the high contrast grating, the high contrast grating includes a semiconductor grating or a dielectric grating, the high contrast grating is used for transmitting light in a first polarization direction, the plasma metal antenna structure is used for reflecting light in a second polarization direction, and the first polarization direction is opposite to the second polarization direction.

17 Claims, 14 Drawing Sheets

(58) Field of Classification Search
CPC .... G02F 1/0136; G02F 1/13; G02F 1/133548; G02F 1/133528
See application file for complete search history.

(56) References Cited

U.S. PATENT DOCUMENTS

| | | | | |
|---|---|---|---|---|
| 2008/0094547 | A1* | 4/2008 | Sugita | G02B 5/3058 359/487.03 |
| 2008/0106672 | A1* | 5/2008 | Kim | G02F 1/133528 359/485.05 |
| 2008/0218665 | A1* | 9/2008 | Zhang | H04N 9/3105 427/163.1 |
| 2011/0043918 | A1* | 2/2011 | Crouse | G02B 5/203 359/573 |
| 2011/0310329 | A1* | 12/2011 | Kumai | G02B 27/283 359/487.03 |
| 2016/0202552 | A1* | 7/2016 | Ahn | G02F 1/133528 349/122 |

FOREIGN PATENT DOCUMENTS

| | | | | | |
|---|---|---|---|---|---|
| JP | 2012103490 | A | | 5/2012 | |
| JP | 2013231829 | A | | 11/2013 | |
| JP | 2014134564 | A | | 7/2014 | |
| JP | 2017067941 | A | | 4/2017 | |
| KR | 20080040067 | A | | 5/2008 | |
| KR | 20180036615 | A | * | 4/2018 | G02B 5/223 |

OTHER PUBLICATIONS

European Extended Search Report for European Application No. 23217678.4 dated Jun. 21, 2024.

* cited by examiner

HIGH CONTRAST GRATING POLARIZER WITH ADJUSTABLE POLARIZATION CHARACTERISTICS

CROSS-REFERENCE TO RELATED APPLICATION(S)

The present application claims priority to Chinese patent application Nos. 202310727896.2 and 202321552868.3, both filed on Jun. 16, 2023, the entire contents of both of which are incorporated herein by reference.

TECHNICAL FIELD

The present disclosure generally relates to the technical field of photoelectric devices, and in particular, to a high contrast grating polarizer with adjustable polarization characteristics.

BACKGROUND

A polarizer is a filter that allows light waves in a specific polarization direction to pass through but blocks light waves in other polarization directions. Common commercial polarizers include linear polarizers and circular polarizers, which can be widely used in many optical instruments.

In order to effectively suppress scattered and reflected ambient light by the polarization characteristics of polarizers, the polarizers are switched by mechanical devices in related technologies. However, this method has high cost, slow response, and low reliability.

SUMMARY

In view of the foregoing defects or deficiencies in related technologies, it is desired to provide a high contrast grating polarizer with adjustable polarization characteristics, which can change the polarization characteristics of the polarizer by electronic switching, with high efficiency, convenience, and high reliability.

The present disclosure provides a high contrast grating polarizer with adjustable polarization characteristics, including:

- a transparent substrate; and
- a plasma metal antenna structure layer, a refractive index electrically-tunable switching layer, a first electrode layer, and a second electrode layer located on the transparent substrate, where the plasma metal antenna structure layer includes a high contrast grating and a plasma metal antenna structure interleaved with the high contrast grating, the high contrast grating includes a semiconductor grating or a dielectric grating, the high contrast grating is used for transmitting light in a first polarization direction, the plasma metal antenna structure is used for reflecting light in a second polarization direction, and the first polarization direction is opposite to the second polarization direction.

Optionally, in some embodiments of the present disclosure, the refractive index electrically-tunable switching layer includes a liquid crystal layer.

Optionally, in some embodiments of the present disclosure, the refractive index electrically-tunable switching layer is located between the high contrast grating and the plasma metal antenna structure; or the refractive index electrically-tunable switching layer is located above the plasma metal antenna structure layer.

Optionally, in some embodiments of the present disclosure, the first electrode layer is located above the refractive index electrically-tunable switching layer, and the second electrode layer is connected to the plasma metal antenna structure; or the first electrode layer is located above the refractive index electrically-tunable switching layer, and the second electrode layer is located below the plasma metal antenna structure layer; or the first electrode layer is located on a left side of the refractive index electrically-tunable switching layer, and the second electrode layer is located on a right side of the refractive index electrically-tunable switching layer.

Optionally, in some embodiments of the present disclosure, both the first electrode layer and the second electrode layer are transparent conductive films; or the first electrode layer is a transparent conductive film, and the second electrode layer is a portion of the plasma metal antenna structure.

Optionally, in some embodiments of the present disclosure, the plasma metal antenna structure is located in at least one position among a bottom, a left wall, and a right wall of a high contrast grating gap.

Optionally, in some embodiments of the present disclosure, the plasma metal antenna structure is located in at least one position among a top, a left wall, and a right wall of each high contrast grating strip.

Optionally, in some embodiments of the present disclosure, a protective layer is provided between the plasma metal antenna structure layer and the refractive index electrically-tunable switching layer.

Optionally, in some embodiments of the present disclosure, the protective layer includes at least one of a SiN layer, an $Al_2O_3$ layer, or a $SiO_2$ layer.

Optionally, in some embodiments of the present disclosure, the plasma metal antenna structure layer has a periodic structure in length and width directions of the transparent substrate; or the plasma metal antenna structure layer has a periodic structure in the length direction of the transparent substrate and a non-periodic structure in the width direction of the transparent substrate; or the plasma metal antenna structure layer has a periodic structure in the width direction of the transparent substrate and a non-periodic structure in the length direction of the transparent substrate; or the plasma metal antenna structure layer has a non-periodic structure in the length and width directions of the transparent substrate.

From the above technical solutions, it can be seen that the embodiments of the present disclosure have the following advantages:

The embodiments of the present disclosure provide a high contrast grating polarizer with adjustable polarization characteristics, where a plasma metal antenna structure layer is combined with a refractive index electrically-tunable switching layer to change the refractive index of a switching layer in an electrical tuning manner such as an electric or magnetic field, thereby affecting the transmissivity and reflectivity of opposite polarized light, changing the polarization characteristics of the polarizer, and making the polarizer efficient, convenient, responsive, and highly reliable.

BRIEF DESCRIPTION OF THE DRAWINGS

After reading detailed descriptions of non-limiting embodiments with reference to the following accompanying drawings, other features, objectives and advantages of the present disclosure will become more apparent.

REFERENCE NUMERALS

10—high contrast grating polarizer with adjustable polarization characteristics, 11—transparent substrate, 12—plasma metal antenna structure layer, 121—high contrast grating, 122—plasma metal antenna structure, 13—refractive index electrically-tunable switching layer, 14—first electrode layer, 15—second electrode layer, 16—protective glass, 17—protective layer.

DETAILED DESCRIPTION

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by those of ordinary skill in the art based on the embodiments of the present disclosure without any creative efforts shall fall within the scope of protection of the present disclosure.

The terms “first”, “second”, “third”, “fourth”, and the like (if any) in the specification and claims of the present disclosure and the foregoing drawings are intended to distinguish between similar objects but do not necessarily indicate a specific order or sequence. It should be understood that the data used in this way are interchangeable in appropriate circumstances, so that the described embodiments of the present disclosure can be implemented in other orders than the order illustrated or described herein.

Moreover, the terms “include”, “comprise”, and any other variants thereof are intended to cover the non-exclusive inclusion. For example, a process, method, system, product, or device that includes a list of steps or modules is not necessarily limited to those expressly listed steps or modules, but may include other steps or modules not expressly listed or inherent to such a process, method, product, or device.

For ease of understanding and explanation, a high contrast grating polarizer with adjustable polarization characteristics, provided by the embodiments of the present disclosure, is detailed in detail below through FIGS. 1 to 28.

Figure 1:
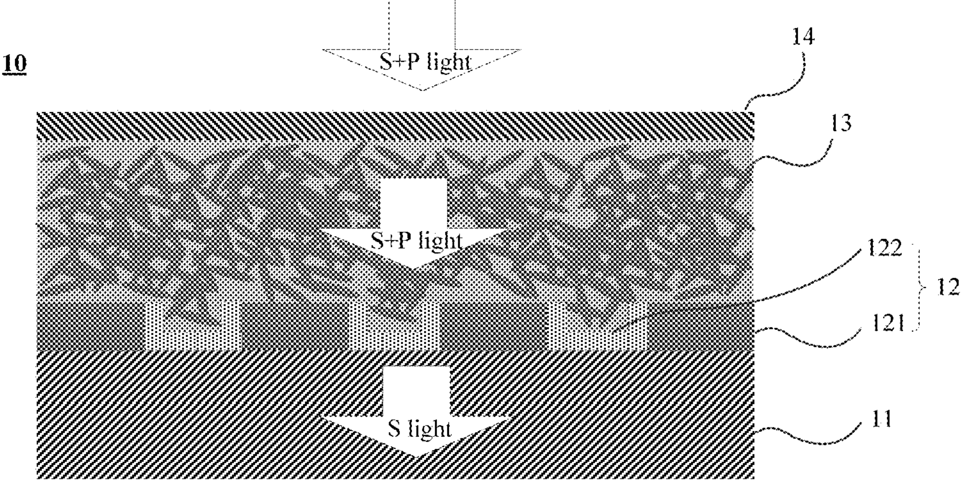
FIG. 1 is a cross-sectional structural diagram of a first high contrast grating polarizer in a first state according to an embodiment of the present disclosure.
Figure 2:
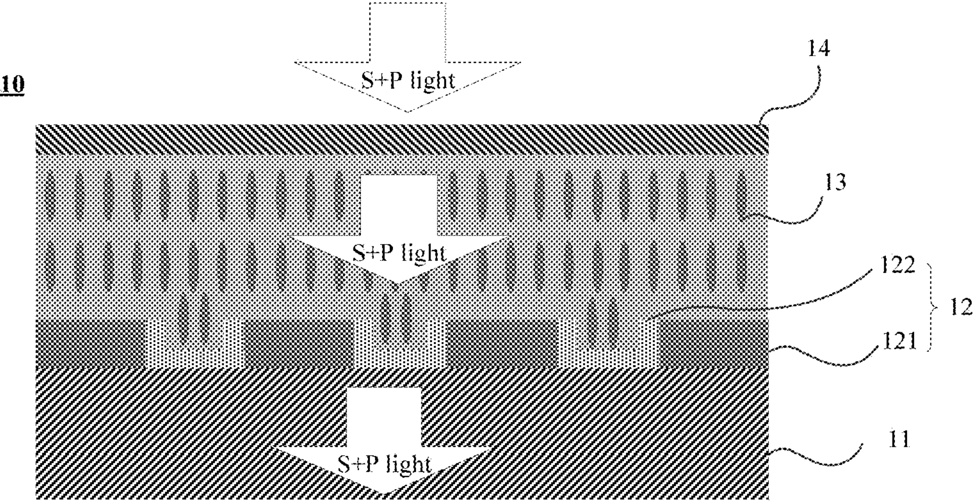
FIG. 2 is a cross-sectional structural diagram of the first high contrast grating polarizer in a second state according to an embodiment of the present disclosure.
Figure 3:
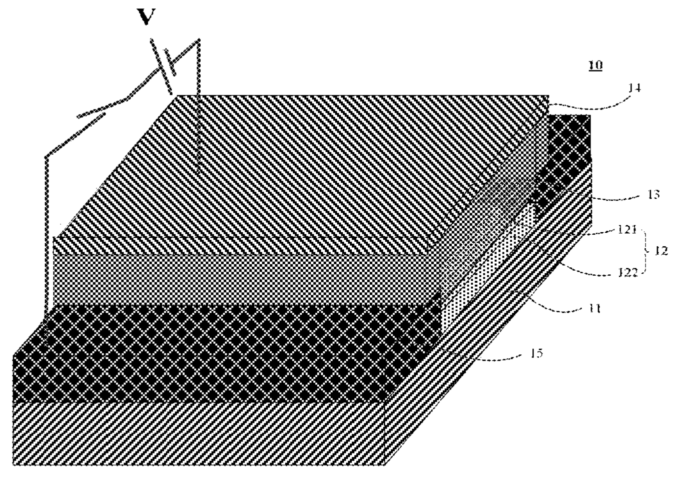
FIG. 3 is a three-dimensional structural diagram of the first high contrast grating polarizer according to an embodiment of the present disclosure.

Refer to FIG. 1 to FIG. 3, which are schematic structural diagrams of a high contrast grating polarizers with adjustable polarization characteristics in different states or perspective according to embodiments of the present disclosures, respectively. The high contrast grating polarizer 10 includes a transparent substrate 11, and a plasma metal antenna structure layer 12, a refractive index electrically-tunable switching layer 13, a first electrode layer 14 and a second electrode layer 15 located on the transparent substrate 11, where the plasma metal antenna structure layer 12 may include a high contrast grating (HCG) 121 and a plasma metal antenna structure 122 interleaved with the high contrast grating 121, the high contrast grating 121 includes but is not limited to a semiconductor grating or a dielectric grating, the high contrast grating 121 can transmit light in a first polarization direction, the plasma metal antenna structure 122 can reflect light in a second polarization direction, and the first polarization direction is opposite to the second polarization direction. For example, polarized light includes but is not limited to S polarized light, P polarized light, circularly polarized light, elliptically polarized light, and the like. The polarization characteristics include but are not limited to polarization direction, transmittance, extinction ratio, polarization type, and the like. Transmitted light is mainly linearly polarized parallel to a high contrast grating strip, and reflected light is mainly polarized perpendicular to the high contrast grating strip.

Optionally, the transparent substrate 11 in the embodiment of the present disclosure may be made of one or more materials that are substantially transparent at working wavelengths of the polarizer. For example, the working wavelengths include but are not limited to EUV (extreme ultraviolet), DUV (deep ultraviolet), UV (ultraviolet), VIS (visible), NIR (near infrared), MIR (mid infrared), FIR (far infrared), THz (terahertz), or the like; the materials include but are not limited to $SiO_2$ (silicon dioxide), $Al_2O_3$ (aluminum oxide), Si (silicon), or the like; or the transparent substrate 11 may be various types of glass substrates, amorphous substrates, polycrystalline substrates, crystalline substrates or the like. The high contrast grating 121 includes but is not limited to a semiconductor grating or a dielectric grating, such as made of Si (silicon), SiN (silicon nitride), $Al_2O_3$ (aluminum oxide), or any other type of non-conductive material. In addition, the plasma metal antenna structure 122 may be made of any type of metal, such as Au (gold), Ag (silver), Al (aluminum), Fe (iron), alloy, or other conductive materials.

Optionally, the refractive index electrically-tunable switching layer 13 in the embodiment of the present disclosure includes but is not limited to a liquid crystal (LC) layer or the like. Liquid crystal is a state of matter with properties between conventional liquid and solid crystals. When rod-like molecules are arranged in a specific direction, LC may form a medium with anisotropic optical properties. When the polarized light is parallel to a long axis of liquid crystal, incident light corresponds to an extraordinary refractive index $n_e$, while when the polarized light is perpendicular to the long axis of liquid crystal, incident light corresponds to an ordinary refractive index $n_o$. Liquid crystal molecules can be reoriented through an electric or magnetic field, and their effective birefringence changes accordingly. Therefore, as the applied electric or magnetic field changes, the incident light undergoes different phase delays. When liquid crystal molecules are randomly oriented, LC can form a medium with isotropic optical properties.

Figure 4A:
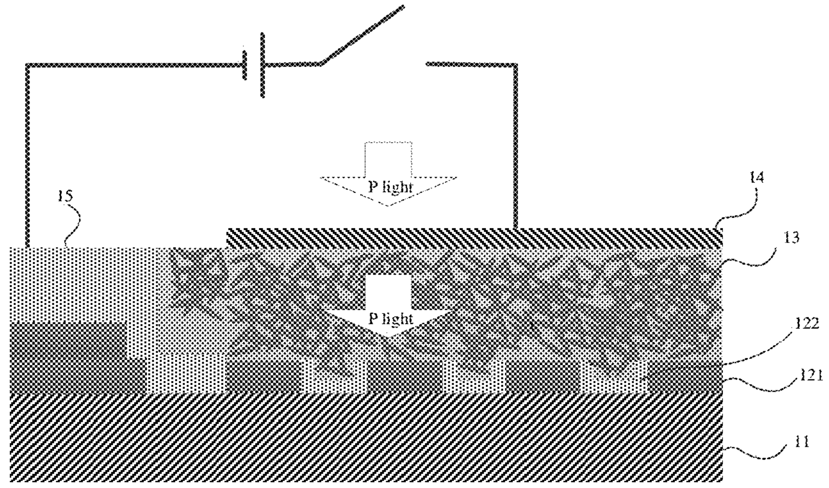
FIGS. 4A and 4B are a schematic diagram of a cross-sectional structure and electric field simulation illustrating that P polarized light is incident on the high contrast grating polarizer to which external voltage is not applied according to an embodiment of the present disclosure.
Figure 4B:
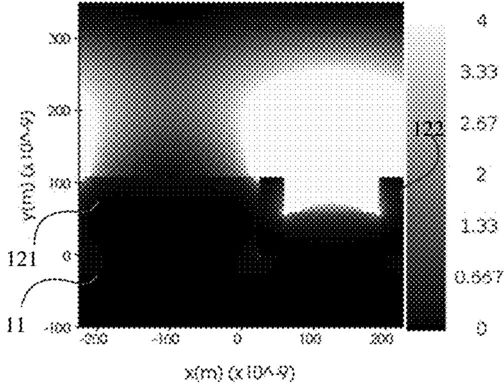
Figure 5A:
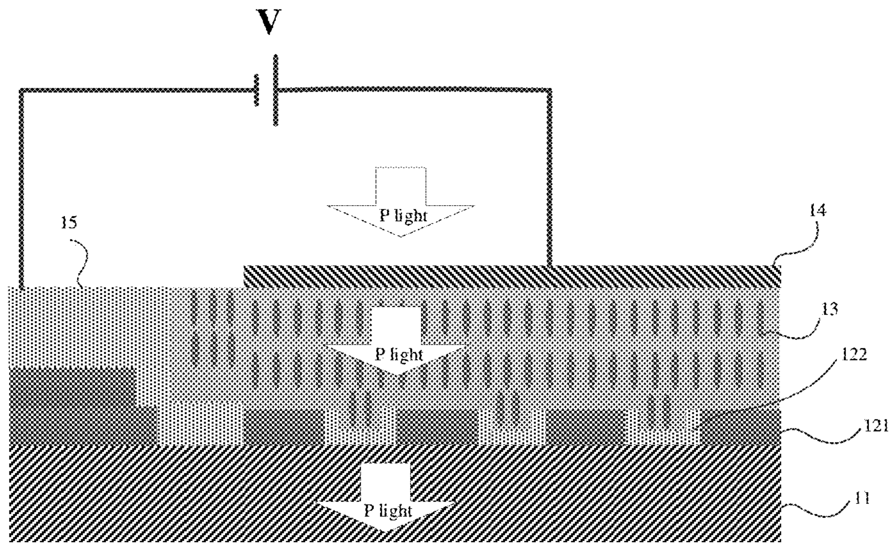
FIGS. 5A and 5B are a schematic diagram of a cross-sectional structure and electric field simulation illustrating that P polarized light is incident on the high contrast grating polarizer to which external voltage is applied according to an embodiment of the present disclosure.
Figure 5B:
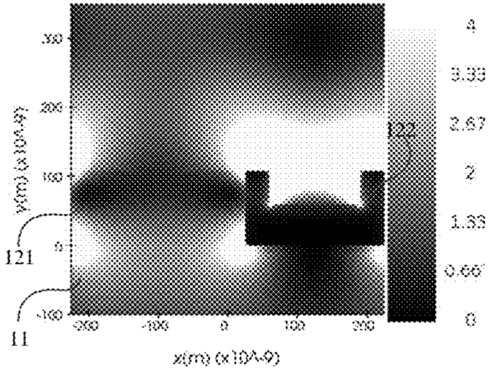

Further, as shown in FIGS. 4A, 4B and FIGS. 5A and 5B, FIG. 4A is a schematic diagram illustrating that P polarized light is incident on the high contrast grating polarizer to which external voltage is not applied, where the P polarized light means that an electric field direction of the light is perpendicular to the grating. In this case, because the electric field direction of the light is perpendicular, the light will significantly interact with the metal, especially two side walls, so that the electric field cannot penetrate the metal but will be reflected. The two side walls reflect the electric field, the two electric fields will interfere with each other, and the cavity will work as an antenna resonator. FIG. 4B illustrates a schematic diagram of electric field simulation of P polarized light with θ equal to 0 degree according to an embodiment of the present disclosure, where the light is reflected and cannot pass through this structure. FIG. 5A is a schematic diagram illustrating that P polarized light is incident on the high contrast grating polarizer to which external voltage is applied. Due to the effect of the external voltage, the orientation of liquid crystal follows a direction, resulting in changes in the refractive index of the surrounding environment. Even though the interaction between light and metal is significant, most of the light will leak through the grating and exhibit high transmittance due to phase mismatch. FIG. 5B illustrates a schematic diagram of electric field simulation of P polarized light with θ equal to 0 degree according to an embodiment of the present disclosure, where the light passes through the grating.

Figure 6A:
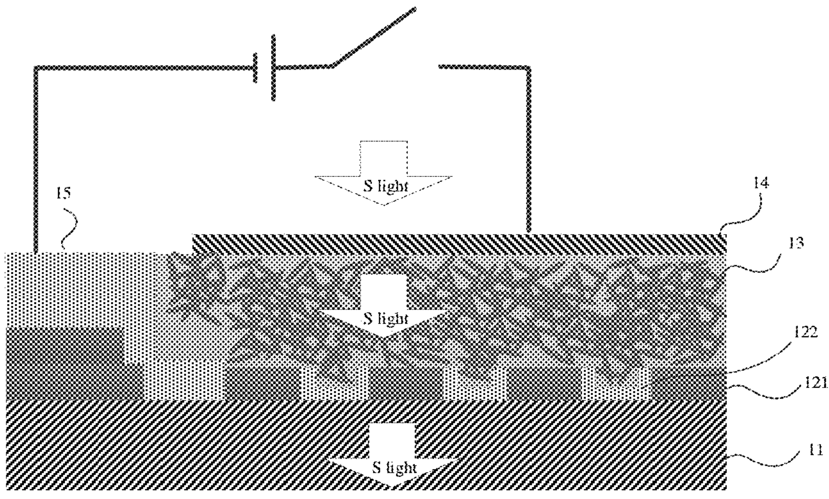
FIGS. 6A and 6B are a schematic diagram of a cross-sectional structure and electric field simulation illustrating that S polarized light is incident on the high contrast grating polarizer to which external voltage is not applied according to an embodiment of the present disclosure.
Figure 6B:
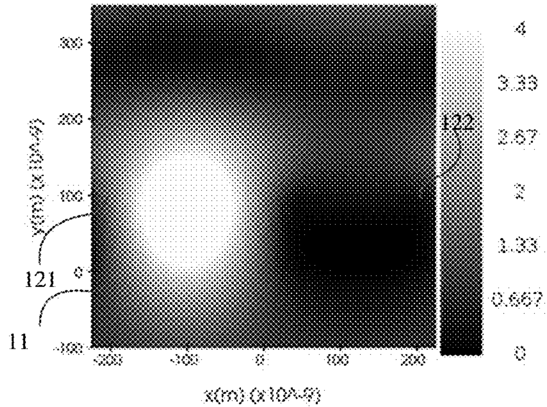
Figure 7A:
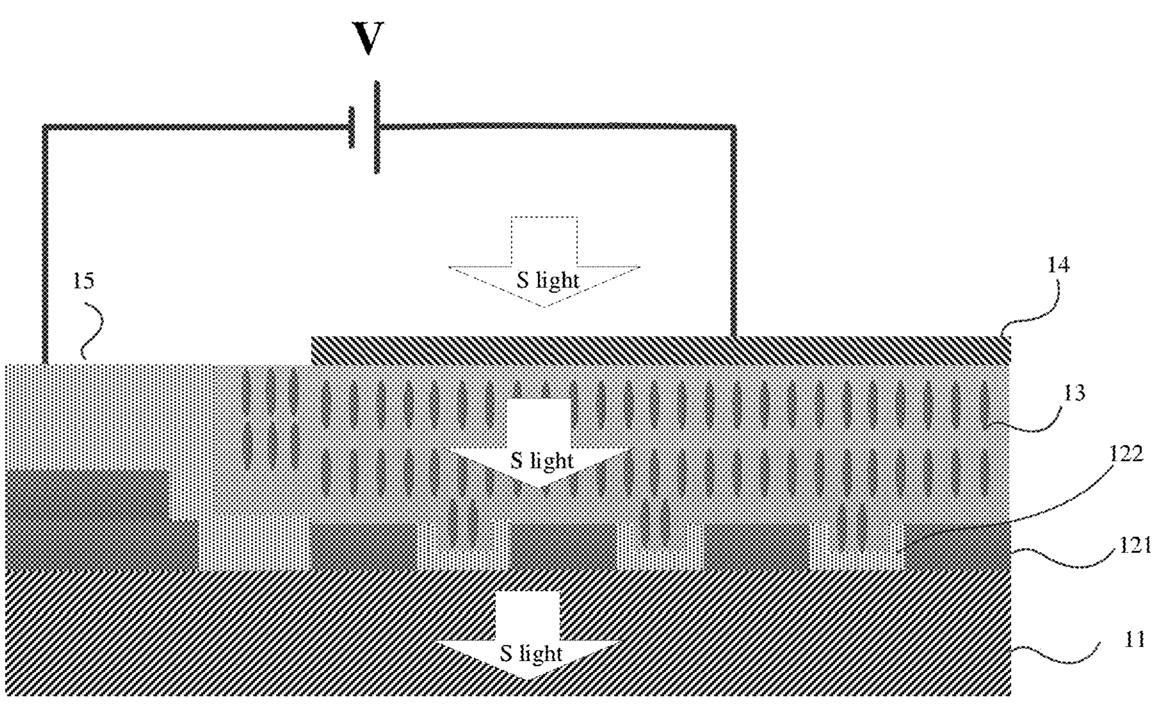
FIGS. 7A and 7B are a schematic diagram of a cross-sectional structure and electric field simulation illustrating that S polarized light is incident on the high contrast grating polarizer to which external voltage is applied according to an embodiment of the present disclosure.
Figure 7B:
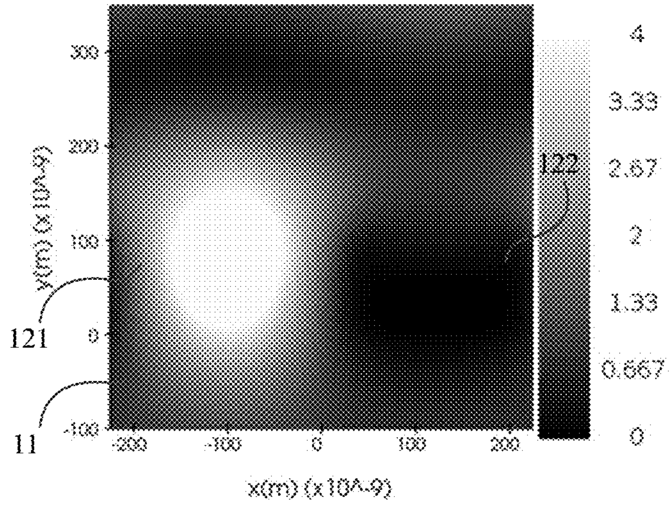
Figure 8:
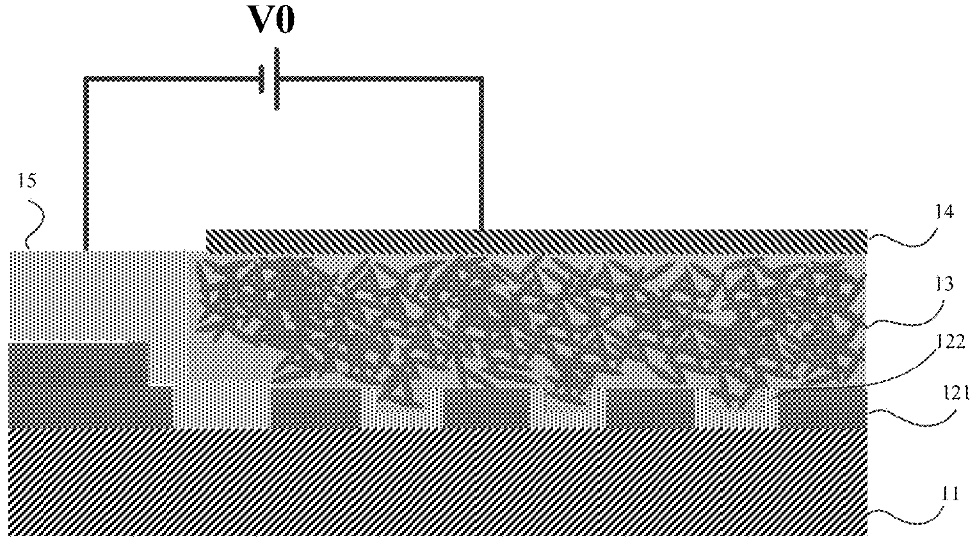
FIG. 8 is a cross-sectional structural diagram illustrating that first external voltage is applied to the high contrast grating polarizer according to an embodiment of the present disclosure.
Figure 9:
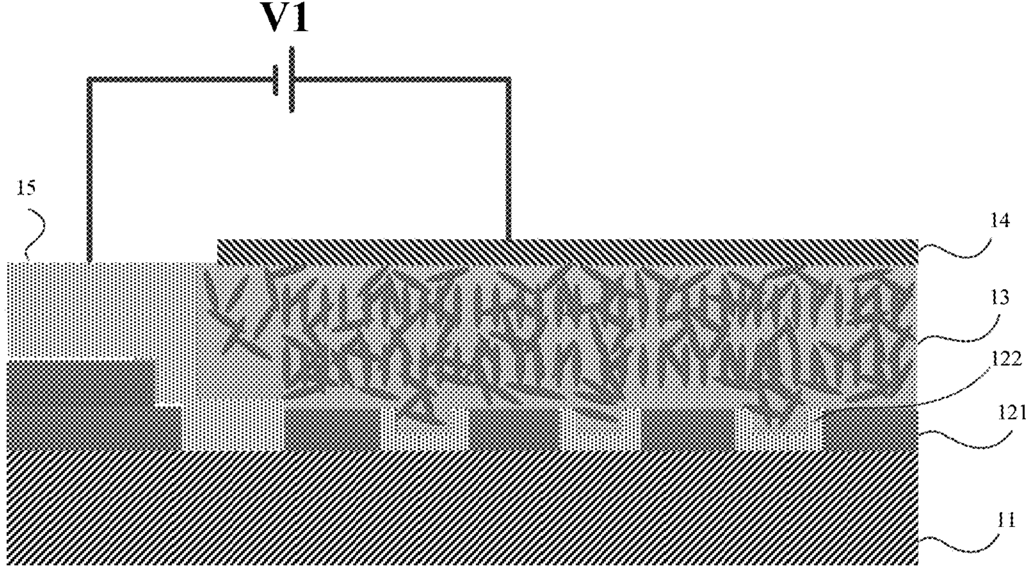
FIG. 9 is a cross-sectional structural diagram illustrating that second external voltage is applied to the high contrast grating polarizer according to an embodiment of the present disclosure.
Figure 10:
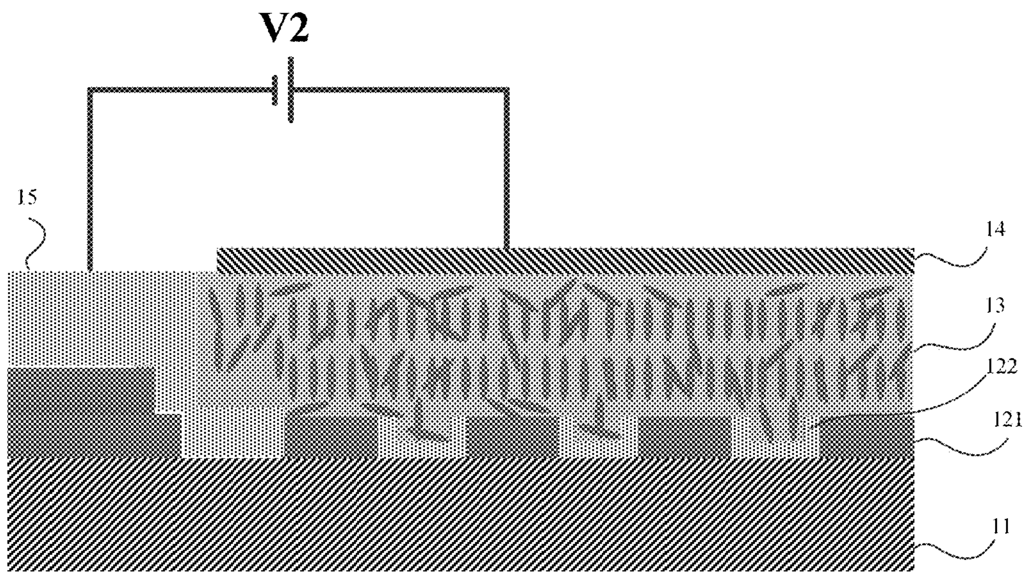
FIG. 10 is a cross-sectional structural diagram illustrating that third external voltage is applied to the high contrast grating polarizer according to an embodiment of the present disclosure.
Figure 11:
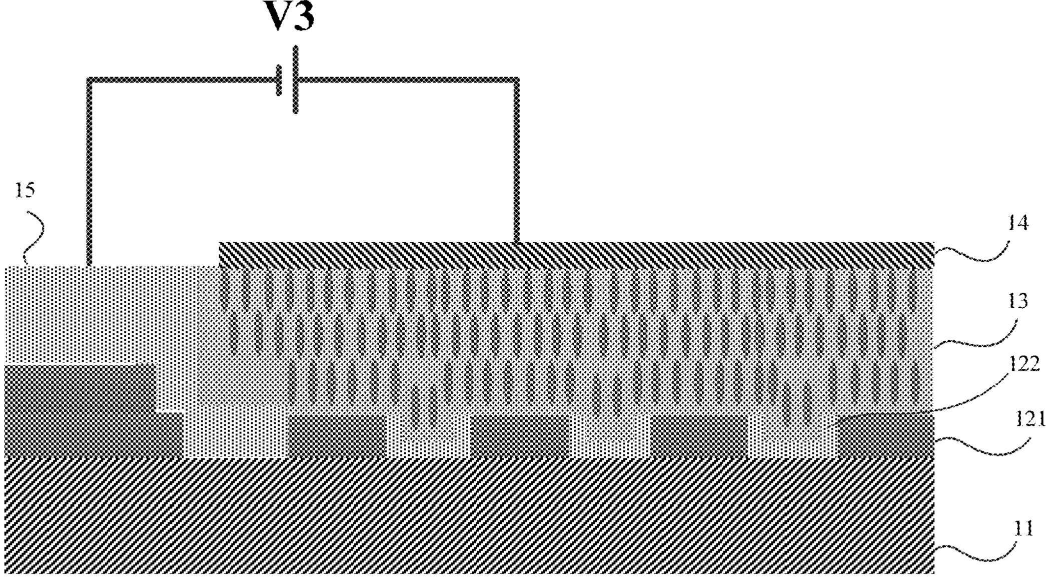
FIG. 11 is a cross-sectional structural diagram illustrating that fourth external voltage is applied to the high contrast grating polarizer according to an embodiment of the present disclosure.

For example, as shown in FIGS. 6A, 6B and FIGS. 7A, 7B, FIG. 6A is a schematic diagram illustrating that S polarized light is incident on the high contrast grating polarizer to which external voltage is not applied, where the S polarized light means that an electric field direction of the light is parallel to the grating. In this case, when the light interacts with the high contrast grating, a reflection phase from a top of the grating and a reflection phase from a bottom of the grating are different by designing a specific period, duty cycle and grating thickness, thereby suppressing light reflection under specific design conditions. Meanwhile, the electric field direction of the light is parallel to the grating, and most of the space between the gratings is filled with air, so the metal affects the light little, and most of the S polarized light passes through this structure. FIG. 6B illustrates a schematic diagram of electric field simulation of S polarized light with θ equal to 0 degree according to an embodiment of the present disclosure, where the light passes through the grating. FIG. 7A is a schematic diagram illustrating that S polarized light is incident on the high contrast grating polarizer to which external voltage is applied. Due to the effect of the external voltage, the orientation of liquid crystal follows a direction, resulting in changes in the refractive index of the surrounding environment. However, most of the S polarized light passes through this structure. FIG. 7B illustrates a schematic diagram of electric field simulation of S polarized light with θ equal to 0 degree according to an embodiment of the present disclosure, where the light passes through the grating.

Further, FIG. 8 to FIG. 11 are schematic diagrams illustrating that different external voltages are applied to the high contrast grating polarizer, respectively, where a relationship among the different external voltages is $V0<V1<V2<V3$.

From the figures, it can be seen that, when a higher voltage is applied, more liquid crystals follow the electric field direction. It should be noted that the refractive index of at least one material in the refractive index electrically-tunable switching layer 13 of the high contrast grating polarizer 10 is changed by applying continuous voltage, electric field, current, or magnetic field (or a combination thereof). The change in refractive index can be substantially isotropic or anisotropic, the change in refractive index can further change the material from an isotropic refractive index to an anisotropic refractive index, and liquid crystals exhibit in the latter way. The change in refractive index can be continuous or abrupt, and electric bias can be applied in a gradient or abrupt manner, so the polarization characteristics can be switched gradually or suddenly. The gradient manner includes (i) implementing a gradual change in transmission of light in a polarization direction, and maintaining transmission of light in an opposite polarization direction to a great extent; (ii) implementing a gradual change in reflection of light in a polarization direction, and maintaining reflection of light in an opposite polarization direction to a great extent; and (iii) tuning an extinction ratio of the polarizer from a higher value to a lower value, and vice versa. The abrupt manner includes (i) switching from a state in which light in a polarization state has high transmission to a state in which light in an opposite polarization state has high transmission, (ii) switching from a state in which light in a polarization state has high reflection to a state in which light in an opposite polarization state has high reflection, (iii) switching from a state in which light in a polarization state has high transmissivity to a state in which light in two polarization states has high transmissivity, and (iv) switching from a state in which light in a polarization state has high reflectivity to a state in which light in two polarization states has high reflectivity.

Figure 12:
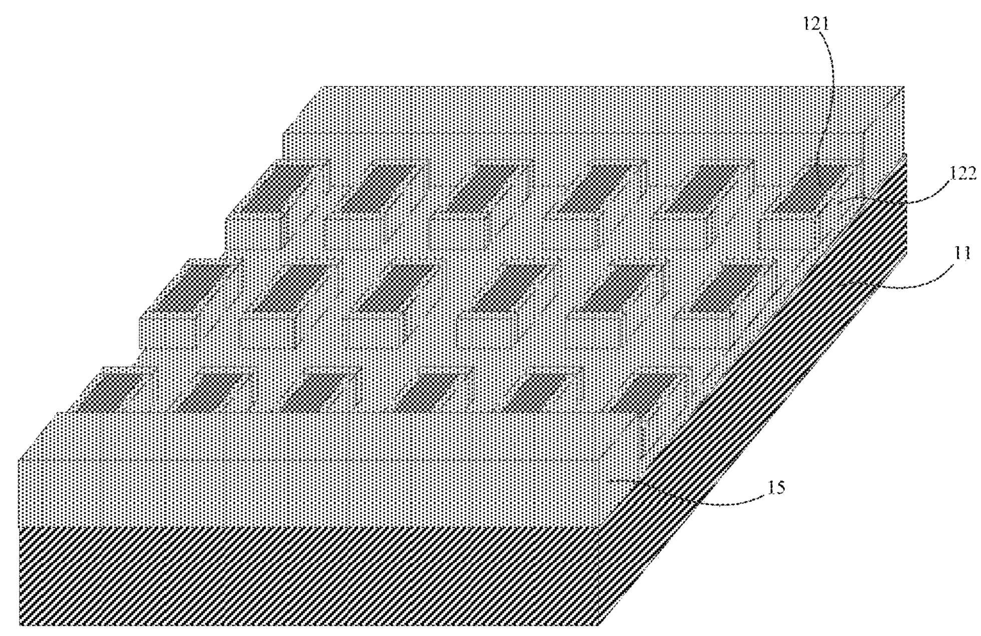
FIG. 12 is a cross-sectional structural diagram of a first plasma metal antenna structure layer according to an embodiment of the present disclosure.
Figure 13:
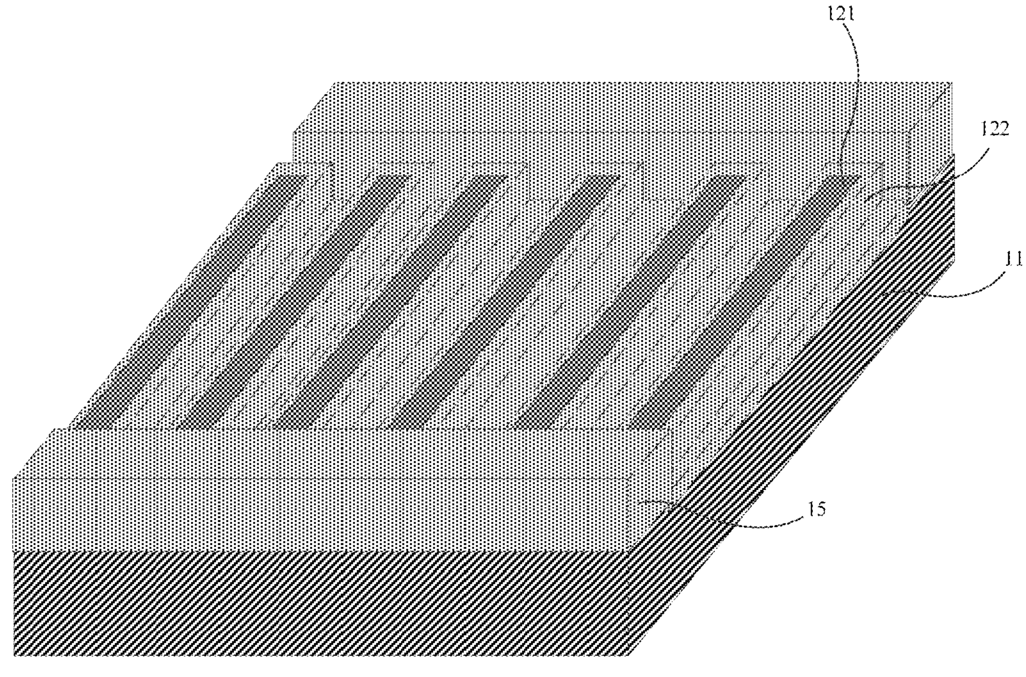
FIG. 13 is a cross-sectional structural diagram of a second plasma metal antenna structure layer according to an embodiment of the present disclosure.
Figure 14:
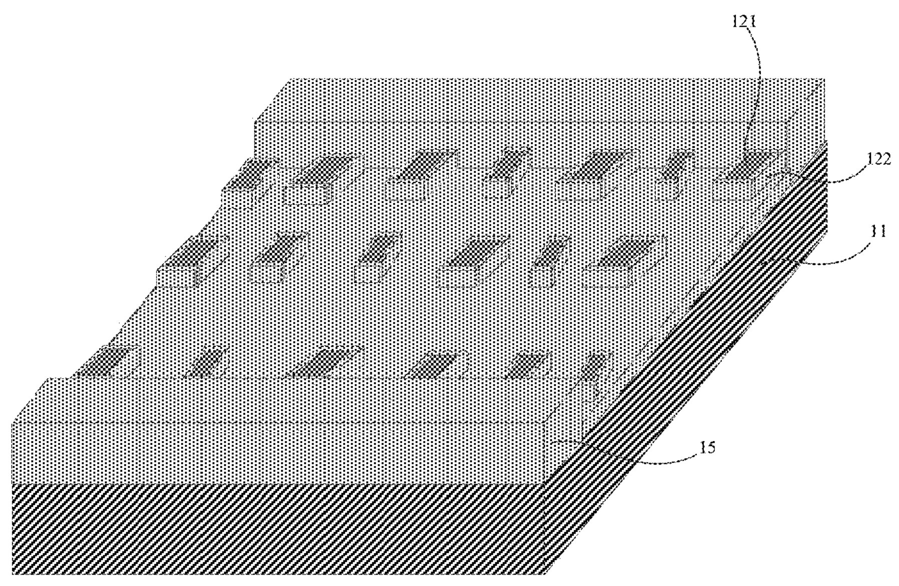
FIG. 14 is a cross-sectional structural diagram of a third plasma metal antenna structure layer according to an embodiment of the present disclosure.
Figure 15:
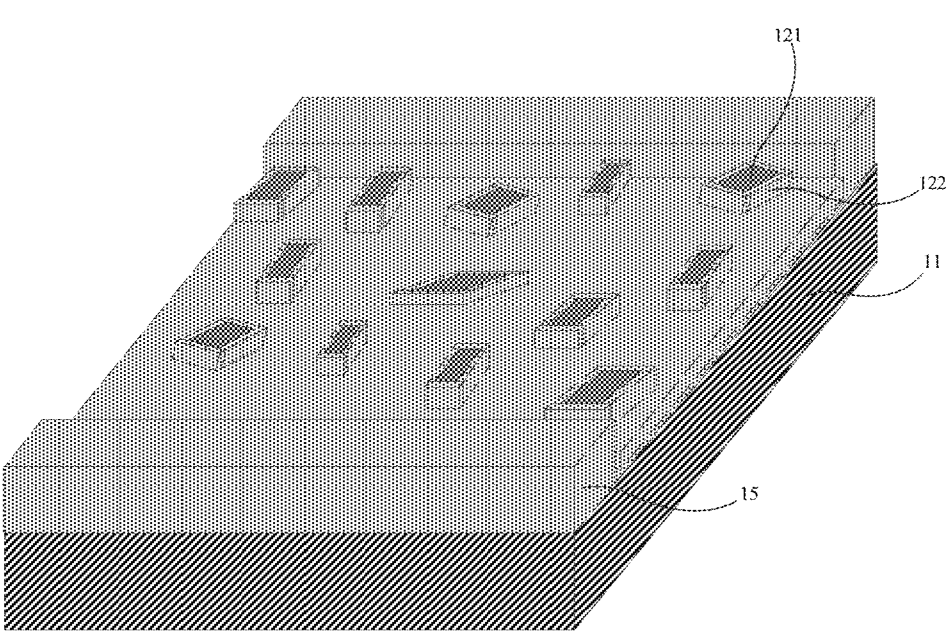
FIG. 15 is a cross-sectional structural diagram of a fourth plasma metal antenna structure layer according to an embodiment of the present disclosure.

Optionally, the high contrast grating polarizer 10 in the embodiment of the present disclosure may be of a periodic or non-periodic structure. In other embodiments of the present disclosure, the high contrast grating polarizer 10 may be of a one-dimensional or two-dimensional structure. For example, as shown in FIG. 12 to FIG. 15, the plasma metal antenna structure layer 12 has a periodic structure in length and width directions of the transparent substrate 11 (as shown in FIG. 12), and this structure may be used for linear polarizers, circular polarizers, elliptical polarizers, and beam splitters; or the plasma metal antenna structure layer 12 has a periodic structure in the length direction of the transparent substrate 11 and a non-periodic structure in the width direction of the transparent substrate 11 (as shown in FIG. 13), and these structures may be used for linear polarizers and beam splitters; or the plasma metal antenna structure layer 12 has a periodic structure in the width direction of the transparent substrate 11 and a non-periodic structure in the length direction of the transparent substrate 11; or the plasma metal antenna structure layer 12 has a non-periodic structure in the length and width directions of the transparent substrate 11 (as shown in FIG. 14 and FIG. 15), and this structure may be used for linear polarizers, circular polarizers, elliptical polarizers, and beam splitters. It should be noted that a one-dimensional or two-dimensional grating structure with a specific preferred transverse direction is beneficial to the application of a polarizer commonly used as a linear polarizer. In a preferred arrangement, the preferred transverse direction of a grating element is perpendicular or parallel to the polarization of incident light. As an example, a two-dimensional grating structure with chiral symmetry is a preferred embodiment, where the polarizer is commonly used as a circular polarizer. As another example, a combination of two grating characteristics will be a preferred embodiment for controlling elliptically polarized light. In addition, for light incident from a large field of view, in order to obtain high efficiency in the transmission or reflection direction of the grating, the grating of the polarizer preferably has a period less than a specific value related to the wavelength of light to prevent diffraction loss.

For example, various structures of the high contrast grating polarizer 10 in the embodiments of the present disclosure will be explained in detail below. For example, the refractive index electrically-tunable switching layer 13 is located between the high contrast grating 121 and the plasma metal antenna structure 122 (as shown in FIG. 1, etc.); or the refractive index electrically-tunable switching layer 13 is located above the plasma metal antenna structure layer 12. Such setting can effectively switch the optical characteristics of the high contrast grating polarizer 10, with high sensitivity and high reliability.

Figure 16:
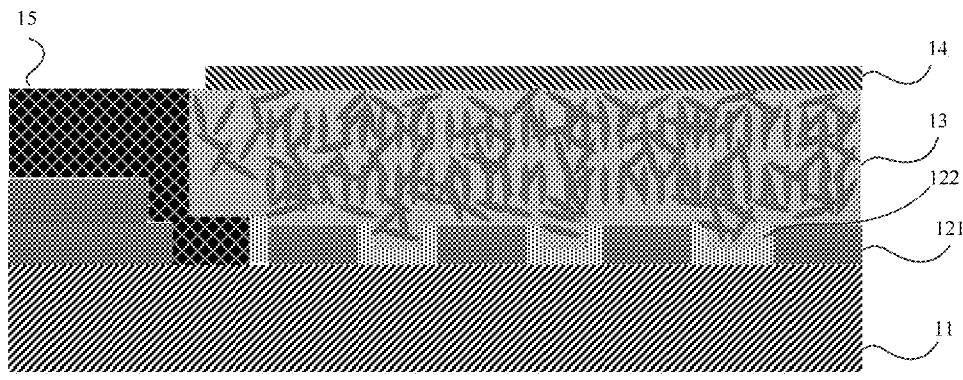
FIG. 16 is a cross-sectional structural diagram of a second high contrast grating polarizer according to an embodiment of the present disclosure.
Figure 17:
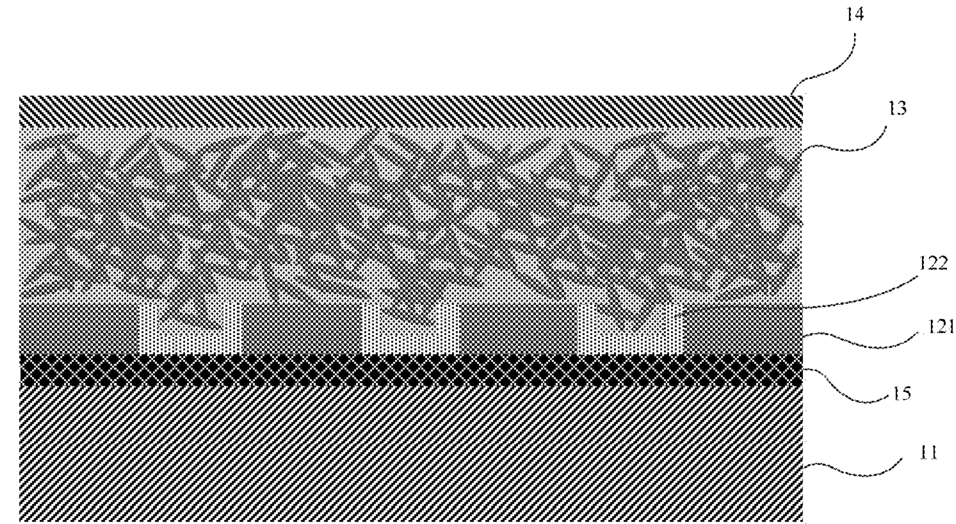
FIG. 17 is a cross-sectional structural diagram of a third high contrast grating polarizer according to an embodiment of the present disclosure.
Figure 18:
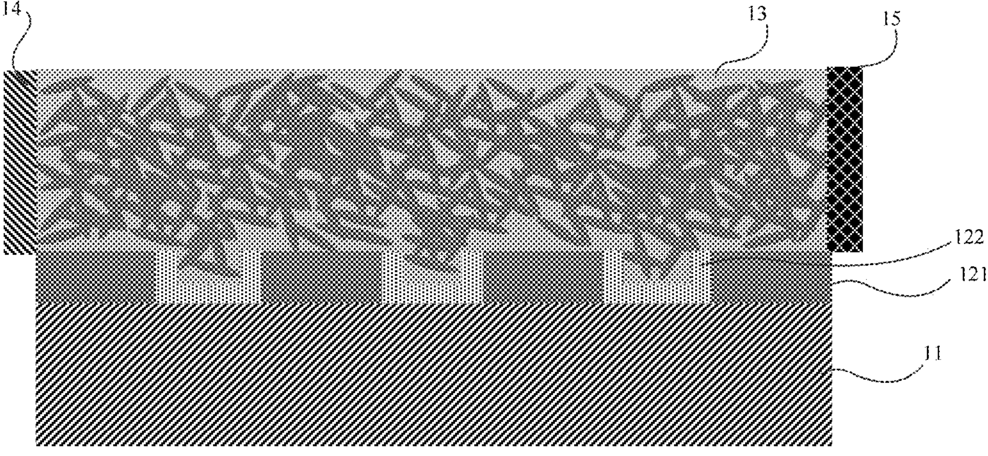
FIG. 18 is a cross-sectional structural diagram of a fourth high contrast grating polarizer according to an embodiment of the present disclosure.

For another example, the first electrode layer 14 is located above the refractive index electrically-tunable switching layer 13, and the second electrode layer 15 is connected to the plasma metal antenna structure 122 (as shown in FIG. 16, etc.); or the first electrode layer 14 is located above the refractive index electrically-tunable switching layer 13, and the second electrode layer 15 is located below the plasma metal antenna structure layer 12 (as shown in FIG. 17); or the first electrode layer 14 is located on a left side of the refractive index electrically-tunable switching layer 13, and the second electrode layer 15 is located on a right side of the refractive index electrically-tunable switching layer 13 (as shown in FIG. 18).

Figure 19:
FIG. 19 is a cross-sectional structural diagram of a fifth high contrast grating polarizer according to an embodiment of the present disclosure.

Optionally, both the first electrode layer 14 and the second electrode layer 15 are transparent conductive films; or the first electrode layer 14 is a transparent conductive film, and the second electrode layer 15 is a portion of the plasma metal antenna structure 122. For example, the transparent conductive film includes but is not limited to ITO (tin-doped indium oxide) glass and FTO (fluorine-doped tin oxide) glass, and a portion of the plasma metal antenna structure 122 may be an Au (gold) contact electrode. In addition, protective glass 16 (as shown in FIG. 19) may be further provided on the first electrode layer 14 to effectively protect the high contrast grating polarizer 10 and prolong its service life.

Figure 20:
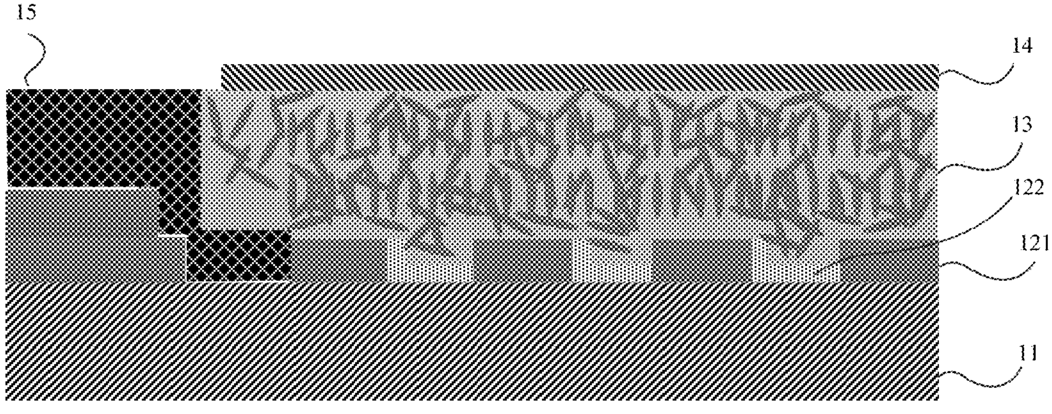
FIG. 20 is a cross-sectional structural diagram of a sixth high contrast grating polarizer according to an embodiment of the present disclosure.
Figure 21:
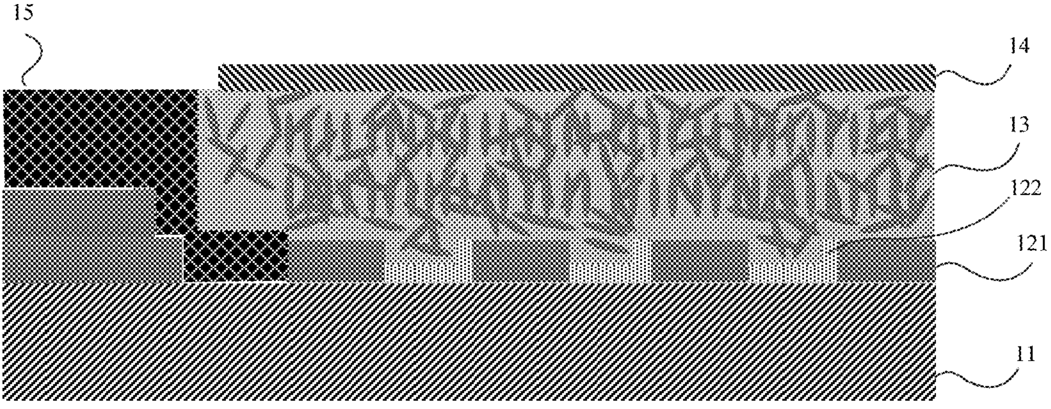
FIG. 21 is a cross-sectional structural diagram of a seventh high contrast grating polarizer according to an embodiment of the present disclosure.
Figure 22:
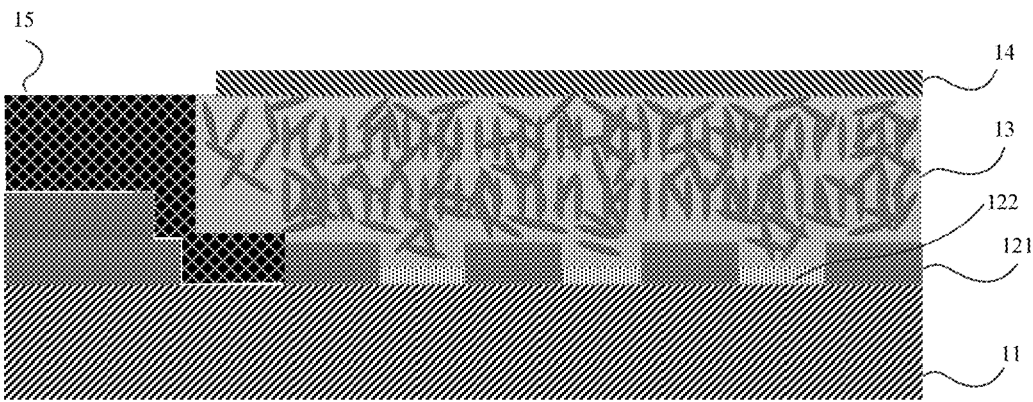
FIG. 22 is a cross-sectional structural diagram of an eighth high contrast grating polarizer according to an embodiment of the present disclosure.

For another example, the plasma metal antenna structure 122 is located in at least one position among a bottom, a left wall, and a right wall of a high contrast grating gap. For example, the plasma metal antenna structure 122 is located at the bottom, left wall, and right wall of the high contrast grating gap (as shown in FIG. 1, etc.); or the plasma metal antenna structure 122 is located at the bottom and left wall of the high contrast grating gap (as shown in FIG. 20); or the plasma metal antenna structure 122 is located at the bottom and right wall of the high contrast grating gap (as shown in FIG. 21); or the plasma metal antenna structure 122 is located at the bottom of the high contrast grating gap (as shown in FIG. 22).

Figure 23:
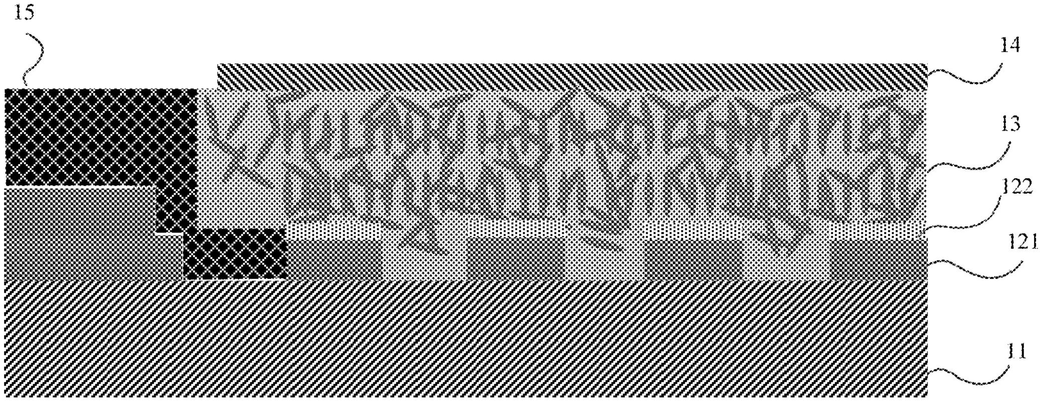
FIG. 23 is a cross-sectional structural diagram of a ninth high contrast grating polarizer according to an embodiment of the present disclosure.
Figure 24:
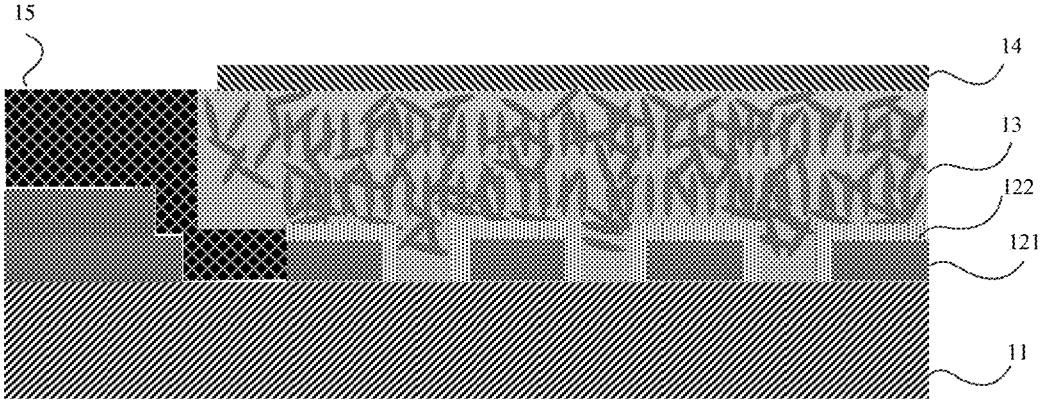
FIG. 24 is a cross-sectional structural diagram of a tenth high contrast grating polarizer according to an embodiment of the present disclosure.
Figure 25:
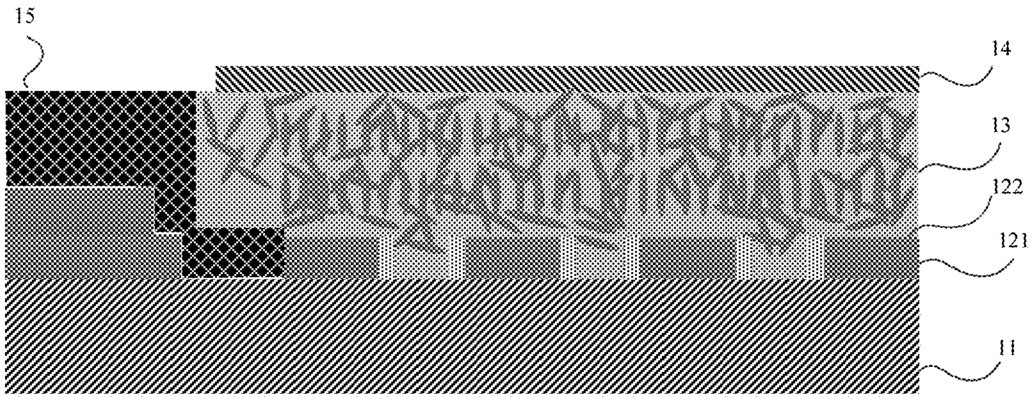
FIG. 25 is a cross-sectional structural diagram of an eleventh high contrast grating polarizer according to an embodiment of the present disclosure.

For another example, the plasma metal antenna structure 122 is located in at least one position among a top, a left wall, and a right wall of each high contrast grating strip. For example, the plasma metal antenna structure 122 is located at the top of each high contrast grating strip (as shown in FIG. 23); or the plasma metal antenna structure 122 is located at the top, left wall, and right wall of each high contrast grating strip (as shown in FIG. 24); or the plasma metal antenna structure 122 is located on the left and right walls of each high contrast grating strip (as shown in FIG.

Figure 26:
FIG. 26 is a cross-sectional structural diagram of a twelfth high contrast grating polarizer according to an embodiment of the present disclosure.
Figure 27:
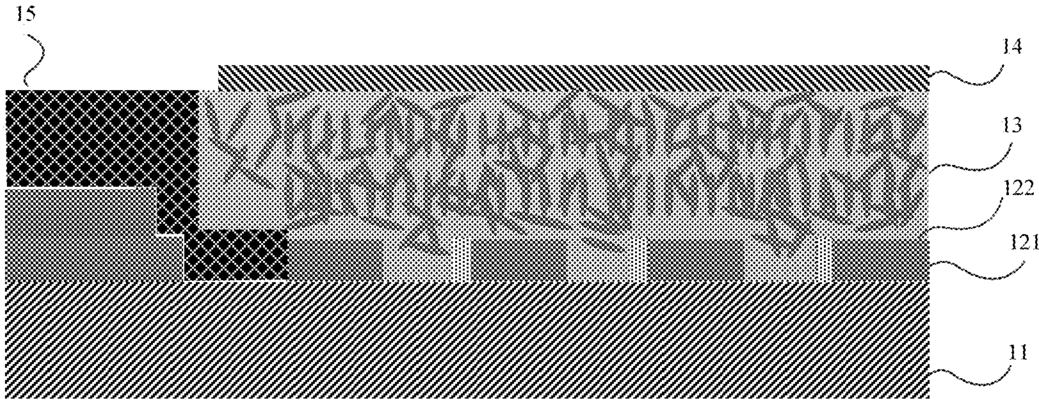
FIG. 27 is a cross-sectional structural diagram of a thirteenth high contrast grating polarizer according to an embodiment of the present disclosure.

25); or the plasma metal antenna structure 122 is located on the right wall of each high contrast grating strip (as shown in FIG. 26); or the plasma metal antenna structure 122 is located on the left wall of each high contrast grating strip (as shown in FIG. 27).

Optionally, in the embodiments of the present disclosure, a first bonding layer is provided between the transparent substrate 11 and the high contrast grating 121, thereby enhancing adhesion of the high contrast grating 121. The first bonding layer may include any of a SiN layer, an $Al_2O_3$ layer, and a $SiO_2$ layer. In an actual production process, the first bonding layer may be deposited by ALD (Atomic Layer Deposition), PECVD (Plasma Enhanced Chemical Vapor Deposition), CVD (Chemical Vapor Deposition), PVD (Physical Vapor Deposition), or the like.

Optionally, in the embodiments of the present disclosure, a second bonding layer is further provided between the transparent substrate 11 and the plasma metal antenna structure 122, and/or between the high contrast grating 121 and the plasma metal antenna structure 122, thereby enhancing adhesion of a metal surface. The second bonding layer may include any of a Ti (titanium) layer, a Ge (germanium) layer, and an Al (aluminum) layer. In the actual production process, the second bonding layer may be deposited by ALD, PECVD, CVD, PVD, sputtering, or the like.

Figure 28:
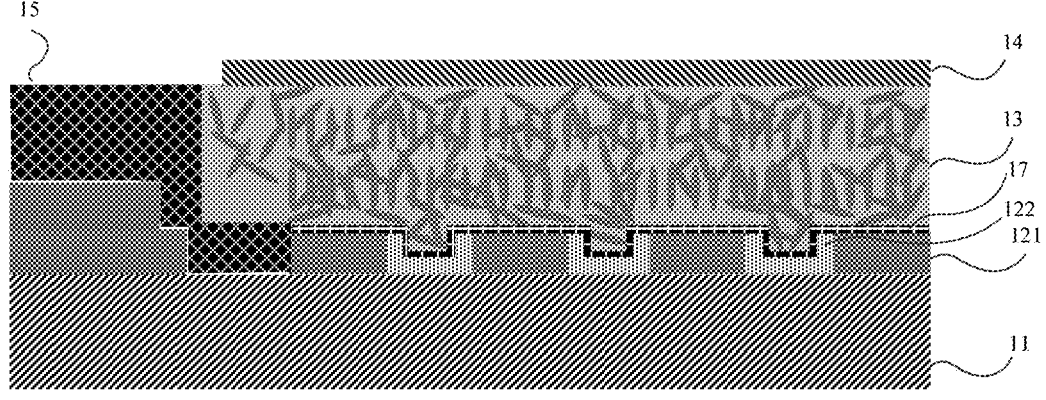
FIG. 28 is a cross-sectional structural diagram of a fourteenth high contrast grating polarizer according to an embodiment of the present disclosure.

Optionally, as shown in FIG. 28, in the embodiments of the present disclosure, a protective layer 17 is provided between the plasma metal antenna structure layer 12 and the refractive index electrically-tunable switching layer 13, thereby improving manufacturability, reliability, and performance of the high contrast grating polarizer 10. The protective layer 17 may include any of a SiN layer, an $Al_2O_3$ layer, and a $SiO_2$ layer, and may be deposited by ALD, PECVD, CVD, PVD, or the like.

It should be noted that, first, in the embodiments of the present disclosure, a metal adjacent to a grating side wall, a metal adjacent to another grating side wall, a metal at a bottom of a grating gap, and a metal at a top of a grating may have different thicknesses. In the polarizer with the plasma metal antenna structure 122 located at the bottom, left wall, and right wall of the high contrast grating gap, a ratio of the thickness of the side wall metal to the thickness of the bottom metal may be greater than 0.2 and less than 3. There may be a gap between the metal and the high contrast grating 121, and/or between the metal and the transparent substrate 11, and the gap should be less than 30 nm. The metal layer may be discontinuous, that is, there may be pores, and the discontinuous size should be less than the distance between two gratings.

Second, in order to improve the manufacturability, reliability, and performance of the high contrast grating polarizer 10, various structures and layers may be added in the embodiments of the present disclosure without changing the basic features of the present disclosure. These configurations should be considered as some of the present disclosure. Examples of such layers include: (i) layers that facilitate bonding of various components in the present disclosure. In one embodiment, a thin dielectric layer may exist between the substrate and the grating of the polarizer to improve adhesion of the grating to the substrate. In a preferred embodiment of a polarizer working in a transmission mode, this layer is made of a transparent dielectric. In another embodiment, a thin layer may enhance the adhesion between a metal portion and a grating portion of the polarizer. In a preferred embodiment, this layer is a metal layer. (ii) Layers that contributes to the manufacturability of the polarizer. In one embodiment, an auxiliary layer between the substrate and the grating serves as an etching stop layer, which contributes to accurate definitions in the depth and shape of the grating. (iii) Layers that enhance reliability or are used for protection purposes. In one embodiment, a thin auxiliary layer separates a material with a switchable refractive index from the grating and metal portions of the polarizer to enhance the reliability of a device. In a preferred embodiment, LC is used as a material, and the transparent electrode is implemented by ITO or FTO glass. The glass substrate of this transparent electrode is also used as an auxiliary layer to protect and hide the LC inside the device.

Further, a plurality of transparent conductive materials and thin films can be used for forming some or all electrodes to implement the high contrast grating polarizer 10. Preferred materials for the electrodes are ITO, FTO, and nanostructured electrodes. In a preferred embodiment of the high contrast grating polarizer 10, the metal portion of the polarizer is used as a portion of an electrode, and the transparent ITO glass is used as a portion of another electrode. In another preferred embodiment, the grating and metal portions of the polarizer are separated from the LC through a thin auxiliary layer to improve reliability, and either a transverse electrode is used, or two transparent electrodes are used, one between the auxiliary layer and the LC, and the other at the top of the LC. In a preferred embodiment, the top electrode is made of ITO glass. When the polarizer works as a device for transmitting light, a transparent electrode is a particularly preferred embodiment. When the polarizer is designed to primarily reflect light, at least one opaque electrode may be used.

According to the high contrast grating polarizer with adjustable polarization characteristics provided by the embodiments of the present disclosure, the plasma metal antenna structure layer is combined with the refractive index electrically-tunable switching layer to change the refractive index of the refractive index electrically-tunable switching layer in an electrical tuning manner such as an electric or magnetic field, thereby affecting the transmissivity and reflectivity of opposite polarized light, changing the polarization characteristics of the polarizer, and making the polarizer efficient, convenient, responsive, and highly reliable.

It should be noted that the above embodiments are merely used for explaining the technical solutions of the present disclosure, rather than limiting the present disclosure. Although the present disclosure is described in detail with reference to the foregoing embodiments, those of ordinary skill in the art should understand that they can still make modifications to the technical solutions described in the foregoing embodiments or make equivalent replacements to some technical features therein, without making the essences of the corresponding technical solutions depart from the spirit and scope of the technical solutions in the embodiments of the present disclosure.

What is claimed is:

1. A high contrast grating polarizer with adjustable polarization characteristics, comprising:

a transparent substrate; and a plasma metal antenna structure layer, a refractive index electrically-tunable switching layer, a first electrode layer, and a second electrode layer located on the transparent substrate, wherein the first electrode layer and the second electrode layer are configured for applying an external voltage to switch polarization characteristics of the high contrast grating polarizer, wherein the refractive index electrically-tunable switching layer comprises a liquid crystal layer, wherein the plasma metal antenna structure layer comprises a high contrast grating and a plasma metal antenna structure interleaved with the high contrast grating, the high contrast grating comprises a semiconductor grating or a dielectric grating, the high contrast grating is used for transmitting light in a first polarization direction, wherein the plasma metal antenna structure is configured such that, in response to application of the external voltage, a refractive index change in the liquid crystal layer induces a phase mismatch that causes the plasma metal antenna structure to change from reflecting light in a second polarization direction to transmitting light in the second polarization direction, and wherein the first polarization direction is perpendicular to the second polarization direction.

2. The high contrast grating polarizer according to claim 1, wherein the refractive index electrically-tunable switching layer is located between the high contrast grating and the plasma metal antenna structure; or the refractive index electrically-tunable switching layer is located above the plasma metal antenna structure layer.

3. The high contrast grating polarizer according to claim 2, wherein the refractive index electrically-tunable switching layer comprises a liquid crystal layer.

4. The high contrast grating polarizer according to claim 1, wherein the first electrode layer is located above the refractive index electrically-tunable switching layer, and the second electrode layer is connected to the plasma metal antenna structure; or the first electrode layer is located above the refractive index electrically-tunable switching layer, and the second electrode layer is located below the plasma metal antenna structure layer; or the first electrode layer is located on a left side of the refractive index electrically-tunable switching layer, and the second electrode layer is located on a right side of the refractive index electrically-tunable switching layer.

5. The high contrast grating polarizer according to claim 4, wherein the refractive index electrically-tunable switching layer comprises a liquid crystal layer.

6. The high contrast grating polarizer according to claim 4, wherein both the first electrode layer and the second electrode layer are transparent conductive films; or the first electrode layer is a transparent conductive film, and the second electrode layer is a portion of the plasma metal antenna structure.

7. The high contrast grating polarizer according to claim 6, wherein the refractive index electrically-tunable switching layer comprises a liquid crystal layer.

8. The high contrast grating polarizer according to claim 1, wherein the plasma metal antenna structure is located in at least one position among a bottom, a left wall, or a right wall of a high contrast grating gap.

9. The high contrast grating polarizer according to claim 8, wherein the refractive index electrically-tunable switching layer comprises a liquid crystal layer.

10. The high contrast grating polarizer according to claim 1, wherein the plasma metal antenna structure is located in at least one position among a top, a left wall, or a right wall of each high contrast grating strip.

11. The high contrast grating polarizer according to claim 10, wherein the refractive index electrically-tunable switching layer comprises a liquid crystal layer.

12. The high contrast grating polarizer according to claim 1, wherein a protective layer is provided between the plasma metal antenna structure layer and the refractive index electrically-tunable switching layer.

13. The high contrast grating polarizer according to claim 12, wherein the refractive index electrically-tunable switching layer comprises a liquid crystal layer.

14. The high contrast grating polarizer according to claim 12, wherein the protective layer comprises at least one of a SiN layer, an $Al_2O_3$ layer, or a $SiO_2$ layer.

15. The high contrast grating polarizer according to claim 14, wherein the refractive index electrically-tunable switching layer comprises a liquid crystal layer.

16. The high contrast grating polarizer according to claim 1, wherein the plasma metal antenna structure layer has a periodic structure in length and width directions of the transparent substrate; or the plasma metal antenna structure layer has a periodic structure in the length direction of the transparent substrate and a non-periodic structure in the width direction of the transparent substrate; or the plasma metal antenna structure layer has a periodic structure in the width direction of the transparent substrate and a non-periodic structure in the length direction of the transparent substrate; or the plasma metal antenna structure layer has a non-periodic structure in the length and width directions of the transparent substrate.

17. The high contrast grating polarizer according to claim 16, wherein the refractive index electrically-tunable switching layer comprises a liquid crystal layer.

* * * * *